(12) United States Patent
Nguyen et al.

(10) Patent No.: US 12,286,216 B2
(45) Date of Patent: Apr. 29, 2025

(54) AIRCRAFT LANDING GEAR HAVING INTERLOCKED MALE AND FEMALE PARTS FOR TRANSMITTING MECHANICAL TORQUE

(71) Applicant: SAFRAN LANDING SYSTEMS, Velizy-Villacoublay (FR)

(72) Inventors: Nicolas Nguyen, Moissy-Cramayel (FR); Thierry Blanpain, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 0 days.

(21) Appl. No.: 18/702,297

(22) PCT Filed: Oct. 19, 2022

(86) PCT No.: PCT/EP2022/079053
§ 371 (c)(1),
(2) Date: Apr. 17, 2024

(87) PCT Pub. No.: WO2023/066970
PCT Pub. Date: Apr. 27, 2023

(65) Prior Publication Data
US 2025/0002140 A1 Jan. 2, 2025

(30) Foreign Application Priority Data
Oct. 19, 2021 (FR) .......................................... 2111105

(51) Int. Cl.
*B64C 25/02* (2006.01)
(52) U.S. Cl.
CPC .................................. *B64C 25/02* (2013.01)

(58) Field of Classification Search
CPC ....................................................... B64C 25/02
See application file for complete search history.

(56) References Cited

U.S. PATENT DOCUMENTS 5,378,101 A * 1/1995 Olson ................... B25B 13/485
411/404

FOREIGN PATENT DOCUMENTS

| DE | 102015209559 A1 | 12/2016 |
|---|---|---|
| EP | 0098777 A2 | 1/1984 |
| FR | 2995044 A1 | 3/2014 |

(Continued)

OTHER PUBLICATIONS

International Search Report mailed Jan. 12, 2023, issued in corresponding International Application No. PCT/EP2022/079053, filed Oct. 19, 2022, 6 pages.

(Continued)

*Primary Examiner* — Valentina Xavier
(74) *Attorney, Agent, or Firm* — CHRISTENSEN O'CONNOR JOHNSON KINDNESS PLLC

(57) ABSTRACT

An aircraft landing gear having a male part interlocked with a female part along an interlocking direction is provided. The external contact surface of the male part, when it is observed along the interlocking direction, can be an exclusively convex closed surface having external contact surface portions in the form of rounded lobes that form obstacles to the pivoting of the female part with respect to the male part about the interlocking direction. The aircraft landing gear is suitable for use with an aircraft.

6 Claims, 5 Drawing Sheets

(56) References Cited

FOREIGN PATENT DOCUMENTS

FR 3070370 A1 * 3/2019 ............. B64C 25/36
WO WO-2013152386 A1 * 10/2013 ............. F16D 1/101

OTHER PUBLICATIONS

Written Opinion mailed Jan. 12, 2023, issued in corresponding International Application No. PCT/EP2022/079053, filed Oct. 19, 2022, 9 pages.

* cited by examiner

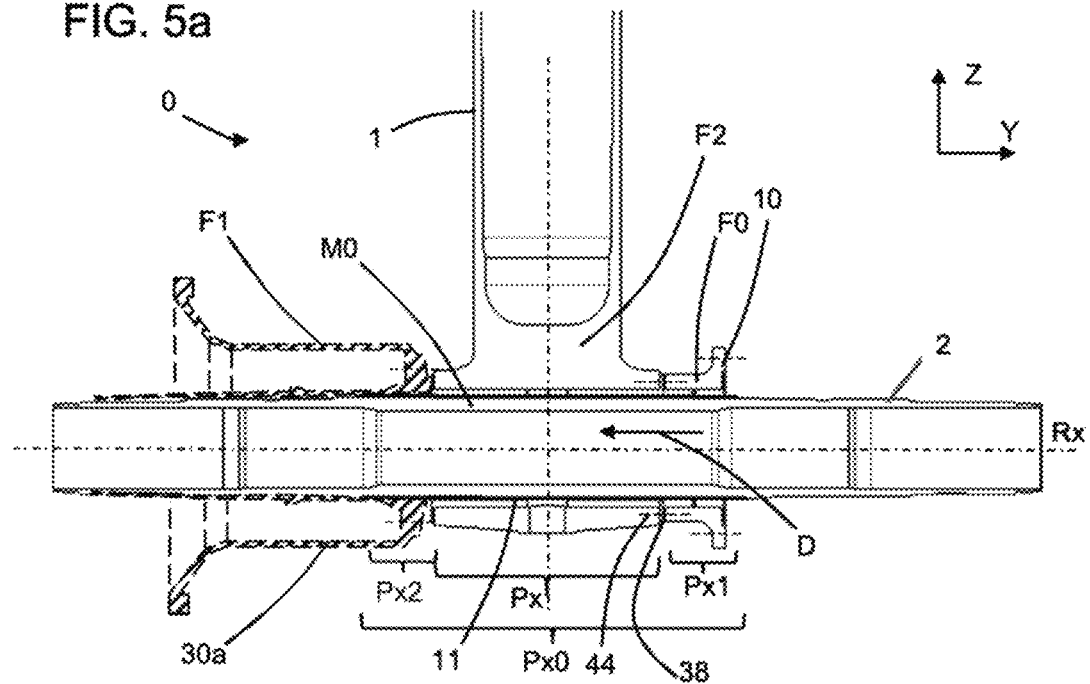
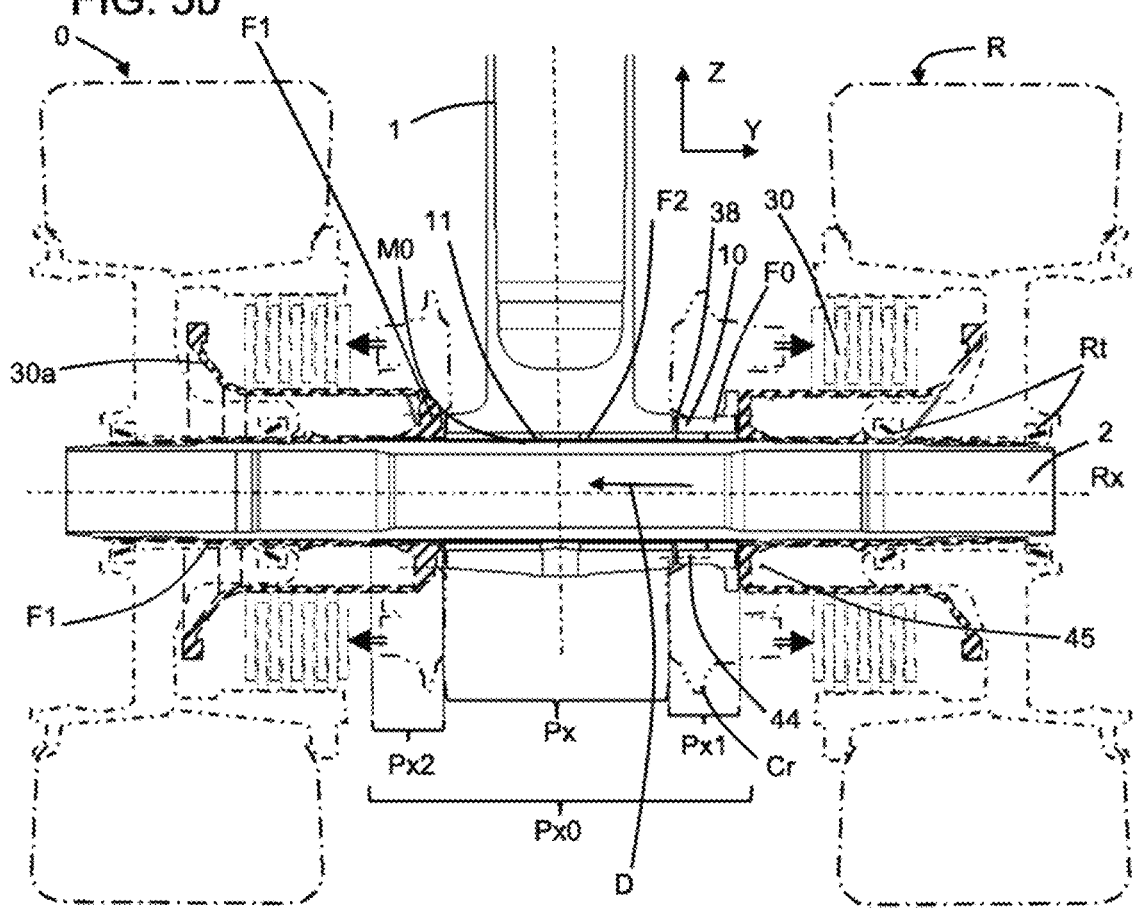

AIRCRAFT LANDING GEAR HAVING INTERLOCKED MALE AND FEMALE PARTS FOR TRANSMITTING MECHANICAL TORQUE

CROSS-REFERENCE TO RELATED APPLICATIONS

This application is a National Stage of International Application No. PCT/EP2022/079053, filed Oct. 19, 2022, which claims priority to French Patent Application No. 2111105, filed Oct. 19, 2021, the entire disclosures of which are hereby incorporated by reference in their entirety for all purposes.

TECHNICAL FIELD

The present invention relates to the field of aircraft landing gears.

BACKGROUND OF THE INVENTION

Several technical solutions have been developed to enable the transmission of significant mechanical torques between different parts of a landing gear, while the landing gear is subjected to variable significant mechanical loads both in intensity and in direction.

Each of these technical solutions is the result of compromise between different design parameters such as the expected mechanical resistance of the landing gear, its durability, its mass, its manufacturing cost, its production complexity, the material volume necessary for production.

The zones of the landing gear, which are the most critical to develop are those which concentrate twisting, shearing and bending stresses.

Such zones must be sized to support the significant variations of stresses undergone by the landing gear all throughout its use.

FIG. 1 illustrates a landing gear sliding rod 1 of the prior art of the type used in the main landing gears of AIRBUS A320® aeroplanes.

This T-shaped sliding rod has an axle 2 intended to receive:
  on the one hand, a pair of wheels rotatably mounted around the axle 2, about an axis of rotation Rx; and
  on the other hand, a pair of brakes, each adapted to brake one of these wheels.

FIGS. 2a and 2b illustrate another example of a landing gear of the prior art presented in patent document FR 3 070 370.

In these examples, FIGS. 1, 2a and 2b, the significant mechanical torques are braking torques which are respectively transmitted from the brakes 30 to the rod 1 via axle hands 10, 10b.

The axle hands 10, 10b are located in high concentration zones of mechanical stresses, twisting due to the braking, bending and shearing torques, due to the bearing reaction of the wheels on the ground and braking forces applied by these wheels R on the ground.

In the particular example of FIG. 1, in order to limit the mass of the sliding rod 1, the rod is a one-piece forged part, very resistant, the axle hands 10, 10b being, in this case, obtained by forging then machining the axle 2.

The manufacturing of the one-piece forged part with its axle hands 10, 10b involves having a forged blank of oversized diameter in the location of the axle hands 10, 10b and removing a significant volume of material by machining around axle hands (to limit the mass of the landing gear as strictly as necessary).

Such a sliding rod 1 is consequently complex to produce, as it requires a large forged blank and a significant machining time with a significant material loss.

In order to overcome these disadvantages, rather than manufacturing one single one-piece forged part, in the example illustrated by FIGS. 2a and 2b, it is proposed to produce an aircraft landing gear provided with axle hands added to the axle 2.

The axle 2 forms a male part M0 interlocked in a female part F0 which forms the added axle hand 10.

This male part M0 has an external contact surface in contact against an internal contact surface of the female part F0, these surfaces being arranged to enable the interlocking of the male part M0 in the female part F0 along an interlocking direction D.

These internal and external contact surfaces comprise grooves Cx, the surface portions of which are complementary to one another to oppose the rotation of the female part F0 with respect to the male part M0 about the axis of rotation of the wheel Rx.

Thus, the diameter of the forged blank used to manufacture the axle 2 can be minimised with respect to the axle of FIG. 1.

This solution of transmitting mechanical torque by interlocking of a male part M0 in a female part F0 is advantageous, as it enables a replacement/exchange of the female part F0 (for example, to meet a technical maintenance or development need of the landing gear).

However, this solution requires a treatment of the external surface of the male part and of the internal surface of the female part to limit the mechanical wear, the incipient cracks and the corrosion of these surfaces.

The quality and the homogeneity of these surface treatments is a determinant factor for the service life of the landing gear.

AIM OF THE INVENTION

An aim of the present invention is to provide an aircraft landing gear comprising a male part interlocked in a female part so as to form an obstacle to the pivoting of the female part with respect to the male part while resolving all or some of the abovementioned disadvantages of the landing gear of the prior art.

SUMMARY OF THE INVENTION

To this end, the invention relates to an aircraft landing gear, comprising a male part interlocked in a female part along an interlocking direction, the male part having an external contact surface in contact against an internal contact surface of the female part.

The aircraft landing gear according to the invention is mainly characterised in that the external contact surface of the male part, when observed along said interlocking direction, is an exclusively convex closed surface and having external contact surface portions in the form of rounded lobes forming obstacles to the pivoting of the female part with respect to the male part about the interlocking direction.

To understand the invention, by exclusively convex closed external contact surface, this means that the external contact surface of the male part observed along the interlocking direction has a profile having a closed contour with no concave portions.

By removing the concavities on the external contact surface of the male part observed along the interlocking direction (like the concavities of the grooves Cx of the abovementioned example of FIGS. 2a and 2b), the changes between concave shapes and convex shapes on the external surface of the male part are removed.

Thus, concavities of the male part are removed, which are usually:
- difficult to machine to form the concavity;
- subjected to mechanical stress concentrations due to combined bending and twisting urges, the maximum stresses tending to appear in the location of the changes between concave surface portion and convex surface portion; and
- sensitive to corrosion (they favour the accumulation of humidity) and difficult to treat fully homogeneously against corrosion risks (the surface treatments are more easily applied on the convex surfaces than on the concave surfaces, which leads to a lesser resistance to corrosion in the concavities).

Thanks to the particular interlocking between male part and female part, the landing gear according to the invention offers an effective solution to transmit mechanical torques, including in the zones of the landing gear which undergo high concentrations of twisting, bending and shearing stresses.

In a first particular embodiment of the landing gear according to the invention, the landing gear comprises a sliding rod which carries said male part in the bottom part, said male part belonging to an axle intended to receive, on the one hand, a rotary wheel about an axis of rotation of the wheel, and on the other hand, a brake associated with the wheel to brake it.

In this first particular embodiment, said interlocking direction is coincident with the axis of rotation of the wheel with respect to said male part and the female part forms a mechanical connection between the brake and the male part to transmit braking torques from the brake to the male part.

This first particular embodiment is advantageous, in that it makes it possible to transmit the braking forces to the axle via a female part coupled on the axle.

This solution of transmitting braking torque to the axle has the abovementioned advantages of the invention.

According to another particular embodiment (hereinafter called third embodiment), alternative to the preceding one, the landing gear comprises a sliding rod which constitutes the male part and which carries an axle in the bottom part, intended to receive, on the one hand, a rotary wheel about an axis of rotation, and on the other hand, a brake associated with the wheel to brake it, the female part constitutes a brake ring belonging to the brake.

In this particular embodiment, said interlocking direction is parallel and coincident with an axis of rotation of the wheel with respect to the axle and the male part constituting the rod is interlocked in the female part constituting the brake ring to directly transmit braking torques from the brake to the sliding rod.

This embodiment is advantageous, in that it enables a direct transmission of the braking torques from the brake ring to the sliding rod without requiring an intermediate part between the brake ring and the sliding rod.

In another particular embodiment, alternative to the preceding particular embodiments of said landing gear according to the invention, said female part constitutes a sliding rod of the landing gear which carries said male part in the bottom part of the sliding rod, said male part constituting an axle of the landing gear intended to receive, on the one hand, a rotary wheel about an axis of rotation, and on the other hand, a brake associated with the wheel, said interlocking direction being parallel and coincident with the axis of rotation of the wheel.

In this embodiment, the portions of the external contact surface which are in the forms of lobes constitute obstacles to the pivoting of the axle with respect to the sliding rod.

For the reasons indicated above, this assembly has a high mechanical resistance, particularly adapted to the junction between the sliding rod and the axle.

In another particular embodiment of the landing gear according to the invention (hereinafter called fourth embodiment), this comprises a box and a sliding rod which carries an axle in the bottom part of the sliding rod, the sliding rod being slidingly mounted with respect to the box, inside the box.

This landing gear also comprises a sleeve interlocked on the box along the interlocking direction, the box constituting the male part and the sleeve constituting the female part, said rounded lobes being formed on the box to form an obstacle to the rotation of the sleeve about the interlocking direction.

This landing gear also comprising a compass provided with first and second arms articulated to one another via a compass axis, the first arm being articulated on the sliding rod and the second arm being articulated on the sleeve, this compass being arranged to oppose the rotation of the sliding rod with respect to the box, while enabling the sliding of the sliding rod in the box.

This embodiment is advantageous, as it makes it possible to easily install a compass articulation on a box without having to forge this articulation on the box.

The manufacturing stresses of the box are thus minimised while enabling a better distribution of mechanical torques on the box.

The invention also relates to an aircraft equipped with such a landing gear.

Other features and advantages of the invention will emerge upon reading the description below of several particular, non-limiting embodiments of the invention.

BRIEF DESCRIPTION OF THE DRAWINGS

Reference will be made to the accompanying drawings, among which:

FIG. 2b has a perspective view of the landing gear rod of FIG. 2a:

FIG. 4b is a side view of this lower end, along an observation direction Y of a system XYZ represented in FIG. 4a:

FIG. 5a is a cross-sectional view, along a plane Y-Z, of an aircraft landing gear according to a second particular embodiment of the invention:

FIG. 5b is a cross-sectional view in a plane Y-Z of the aircraft landing gear illustrated in FIG. 5a:

DETAILED DESCRIPTION OF THE INVENTION

Figure 1:
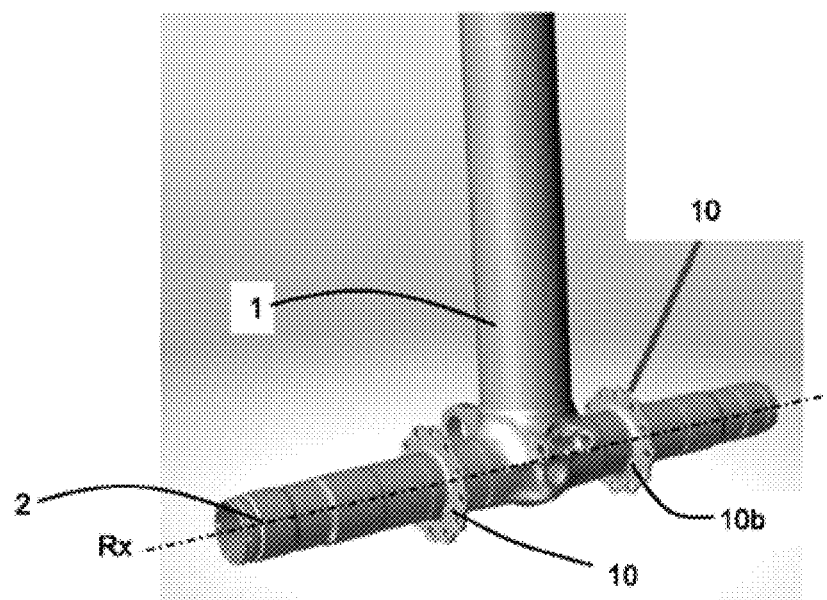
FIG. 1 is a schematic, partial view of a landing gear, according to the prior art.
Figure 2A:
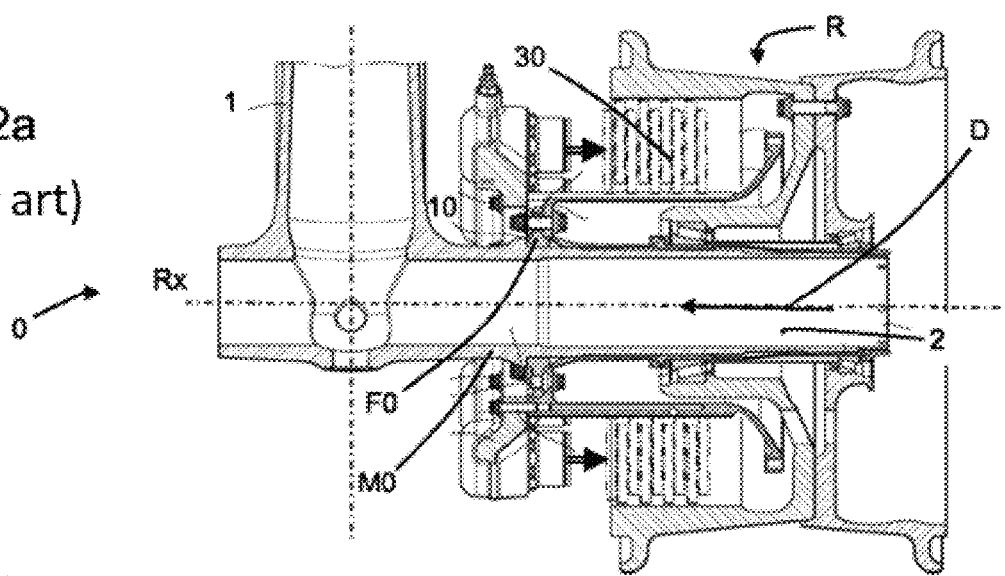
FIG. 2a has a cross-sectional view of a part of an aircraft landing gear of the prior art.
Figure 2B:
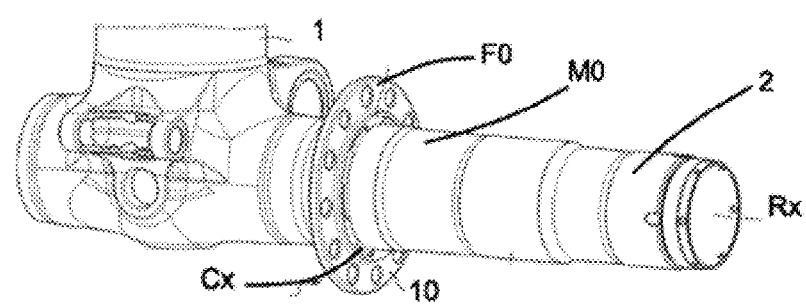

In reference to FIGS. 3 to 7*b*, the invention mainly relates to an aircraft 100 landing gear 0, comprising a male part M0, M1, M3 interlocked in a female part F0, F1, F2, F3.

The male part has an external contact surface in contact against an internal contact surface of the female part.

The internal contact surface and the external contact surface are arranged to enable the interlocking of the male part in the female part along an interlocking direction D.

The external contact surface of the male part M0, M1, M3, when observed along said interlocking direction D has a closed contoured profile, which is exclusively convex and has external contact surface portions in the form of rounded lobes L1, L2, L3, L4, in the representation (it can absolutely be considered to reduce to 3 or increase the number of lobes).

Each of these lobes forms an obstacle to the pivoting of the female part F0, F1, F2, F3 with respect to the male part M0, M1, M3 about the interlocking direction D.

In the figures, the internal contact surface of the female part F0, F1, F2, F3 is also a complementarily-shaped closed surface of the external contact surface of the male part.

Thus, the internal contact surface, when observed along the interlocking direction D, has a profile having a closed and exclusively concave contour, i.e. with no convex portion.

Preferably, as is understood from the examples illustrated by FIGS. 4*b*, 5*b*, 6*b* and 7*b*, the external contact surface of the male part M0, M1, M3 is symmetrical with respect to a median longitudinal plane Y-Z of the male part.

The interlocking direction D is preferably parallel to the median longitudinal plane Y-Z of the male part M0.

Preferably, the lobes L1, L2, L3, L4 are regularly distributed at the periphery of the male part and about the interlocking direction D, and they are at least at the number of 3 lobes.

In the embodiments illustrated in FIGS. 3 to 7*b*, the lobes are at the number of 4 and are identical to one another.

These features make it possible to have four possible orientations of the male part in the female part, which facilitates the assembly of the parts, an odd number of lobes and/or a particular distribution of these lobes can also be used, when it is sought to have a natural keying.

In each of the embodiments illustrated by FIGS. 3, 4*a* and 4*b*, 5*a*, 5*b*, 6*a*, 6*b*, 7*a*, 7*b*, the landing gear 0 comprises a sliding rod 1 which carries an axle 2 in the bottom part.

The axle 2 is intended to receive:
on the one hand, at least one rotary wheel R (in this case, two wheels) about an axis of rotation Rx of the wheel; and
on the other hand, at least one brake 30 (in this case, two brakes 30, 30*a*) associated with the wheel R to brake it.

The integration of the wheels and of the brakes can be performed in different ways.

A particular way to integrate wheels and brakes in the landing gear 0 will be illustrated below in reference to FIGS. 5*a* and 5*b*.

Figure 3:
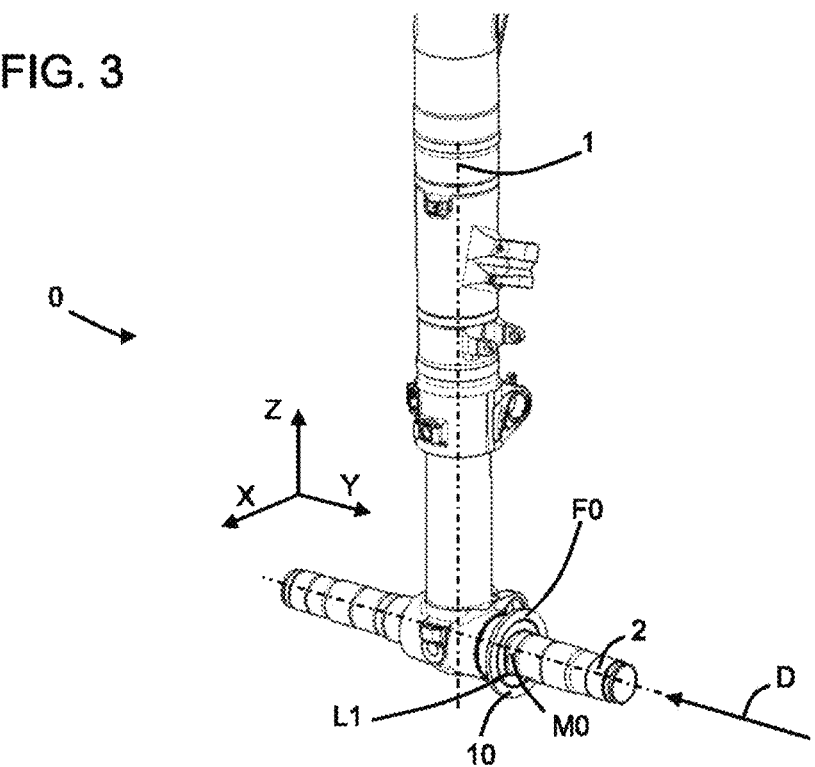
FIG. 3 has a perspective view of a part of an aircraft landing gear according to a first embodiment of the invention.
Figure 4A:
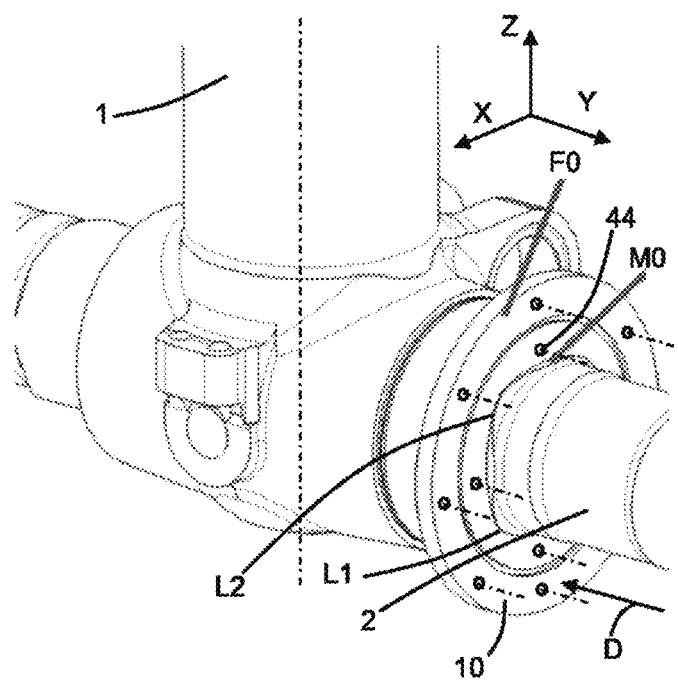
FIG. 4a has a perspective, detailed view of the lower end of the landing gear part illustrated in FIG. 3.
Figure 4B:
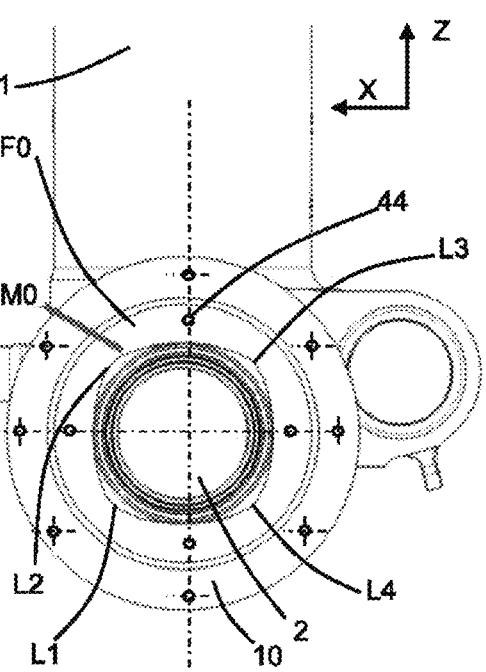

In the first embodiment of the invention illustrated by FIGS. 3, 4*a*, 4*b*, the male part M0 is constituted by the axle 2 and the female part F0 is constituted by an added axle hand 10 by interlocking about the interlocking direction D.

Each female part F0 thus forms a mechanical connection between the at least one of the brakes 30 and the male part M0 to transmit braking torques from the brake 30 in question to the male part 2.

The lobes L1, L2, L3, L4 are, in this case, formed on the external contact surface of the axle 2.

The internal contact surface of the female part F0 which is complementary to said external contact surface is, in this case, formed inside a bore of the axle hand 10.

The interlocking direction D is, in this case, coincides with the axis of rotation Rx of each of the wheels R with respect to said male part M0 belonging to the axle 2.

In the second embodiment illustrated by FIGS. 5*a* and 5*b*, the landing gear 0 comprises bearings Rt around the axle 2 about the axis of rotation Rx.

The brakes 30, 30*a* each comprise a stator tube F1 and a stack of discs alternating stator disc and rotor disc.

The stator discs of each given brake are engaged with the stator tube F1 of this given brake.

The rotor discs of each given brake are engaged with a rim of the wheel R to brake by this given brake.

Each given brake 30, 30*a* also comprises a hydraulic ring Cr, schematised in phantom lines, provided to selectively press the corresponding stack of discs to selectively brake the wheel R associated with the given brake. The axle 2 and the sliding rod 1 extend in length in the cutting plane Y-Z.

This way of integrating the wheel(s) and the brake(s) with respect to the rod 1 and to the axle 2 is transposable to any one of the embodiments of the landing gear according to the invention.

Several examples of possible interlockings of the male part M0 (in this case, the axle 2) with female parts F0, F1, F2 are presented in FIGS. 5*a* and 5*b* to transmit braking torques from the brake to the sliding rod 1 via the rounded lobes of the male part M0.

Each of these examples of interlockings can be used in only one or in more placements of the landing gear.

For example, a given interlocking solution can be used to transmit torques from a first brake 30 to the rod 1 and this same solution can be used, in symmetry with respect to the median transverse plane of the axle, to transmit torques from a second brake 30*a* to the rod 1.

According to a first example of interlocking illustrated in the right part of the landing gear (surface Px1), the female part F0 is an added axle hand 10 to transmit the braking torques from the brake to the axle 2 via the axle hand 10.

The stator tube F1 of the brake is, in this case, fixed/secured to the axle hand 10 via fixings 45, like bolts.

The axle hand 10 is added and interlocked on the male part M0 such that the internal contact surface of the female part F0 which forms a central bore, non-circular, of the axle hand is received in adjustment on the external contact surface of the male part M0 which also forms a non-circular surface to rotatably immobilise the female part F0 on the male part M0.

Ideally, the male part M0 and the female part F0 are assembled such that they are indexed axially against one another.

To this end, it is possible to do such that the female part, which can be the axle hand, is mounted clamped around the male part, which can be an axle. This embodiment limits the need to have a specific axial stopping part.

It can also be done such that clamping means 44 hold the female part against axial stopping means 38 formed on the male part to axially immobilise the female part F0 on the male part M0 about the interlocking direction D.

These clamping means 44 are, in this case, constituted by screws passing through the female part F0 and having threaded longitudinal portions engaged in threadings of the male part.

The female part F0 is thus clamped between screw heads 44 and an axial stopping shoulder 38 formed at the periphery of the male part M0.

The male part M0 forming the axle 2 is added to the sliding rod 1 by interlocking in a bore 11 passing through a lower zone of the sliding rod 1.

This bore 11 forms a non-circular surface Px against which the male part M0 bears to rotatably immobilise the male part M0 with respect to the sliding rod 1.

This bore 11 and the axle 2 have non-circular surfaces which are complementarily shaped to one another, to oppose any rotation of the axle 2 with respect to the rod 1.

The non-circular surface Px of the bore 11, when observed along a longitudinal direction of the axle 2 is an exclusively concave closed surface (i.e. with a closed contour profile) and having complementary shapes of rounded lobes L1, L2, L3, L4 forming obstacles to the pivoting of the axle 2 with respect to the sliding rod 11.

This non-circular surface Px of the bore 11 is complementarily-shaped from an external surface Px0 of the axle 2.

The axle has a cross-section which is constant over the entire surface Px0 of the axle which extends on either side of the rod to assemble the axle hand directly on the axle (like on the right part of the landing gear at the surface Px1), or to assemble a brake stator tube directly on the axle (like on the left part of the landing gear at the surface Px2).

According to the second example of interlocking illustrated in the left part of the landing gear in FIGS. 5a and 5b, the female part F1 constitutes a brake stator tube 30a directly interlocked on the external contact surface of the axle 2 to transmit the braking torque by direct contact between the tube F1 and the axle 2 via the rounded lobes.

In this case, the connection between the brake stator and the axle is made without requiring an axle hand.

According to the third example of interlocking illustrated by FIGS. 5a and 5b, the female part F2 constitutes the sliding rod 1 of the landing gear 0, this part F2 comprising the bore 11 wherein the axle 2 is interlocked.

As indicated above, this bore 11 is non-circular and complementarily-shaped from said external contact surface of the axle 2 to perform an indexing in rotation of the axle 2 with respect to the sliding rod 1 via said lobes L1, L2, L3, L4 forming obstacles. This example of interlocking of the axle enables a better distribution of the mechanical braking torque all around the axle at the interface between the bore 11 and the external surface of the axle.

Figure 6A:
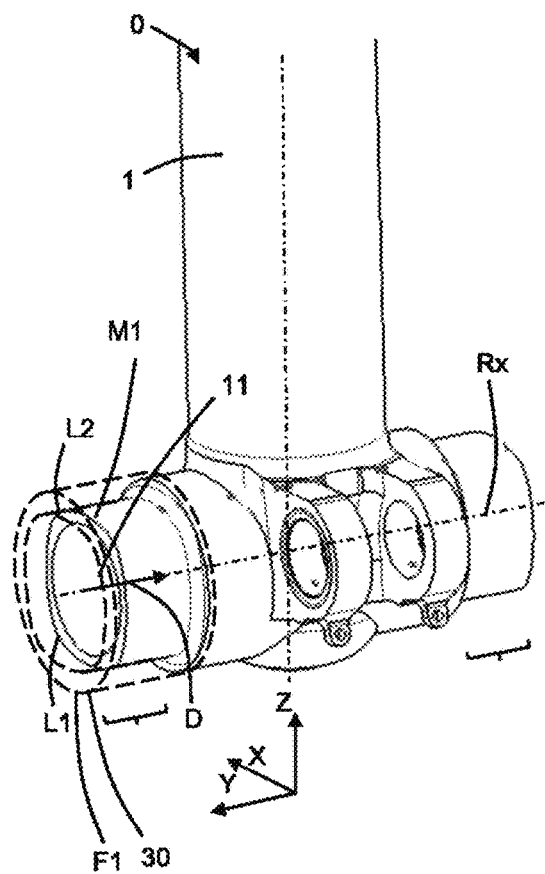
FIG. 6a is a perspective view of a sliding rod end of an aircraft landing gear according to a third particular embodiment of the invention.
Figure 6B:
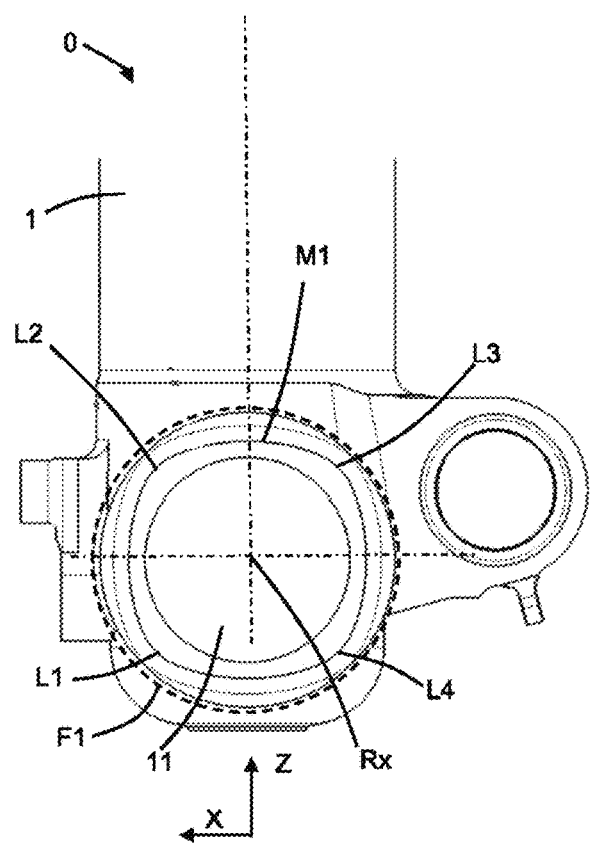
FIG. 6*b* is a side view of said end represented in FIG. 6*a* along the observation direction Y of the system XYZ of FIG. 6*a*.

According to said third particular embodiment of the invention illustrated by FIGS. 6a and 6b, the sliding rod 1 constitutes the male part M1 and the female part F1 (schematised as a dotted line) is constituted by a brake stator ring 30/30a (for example, similar to the stator tube presented in FIGS. 5a and 5b) or by an intermediate ring (of the added axle hand to fix the brake stator) or by a hydraulic brake ring (of the type of the abovementioned ring Cr).

This female part F1 is directly rotatably indexed via the lobes L1, L2, L3, L4 formed outside of the sliding rod 1.

In this embodiment, the axle (not represented) is an added axle which passes through a bore 11 passing through the rod. However, it would also be possible to do, such that the axle is integrated to the rod 1 to form one single one-piece part.

In this embodiment of FIGS. 6a, 6b, the exclusively convex closed external surface of the male part M1 is disposed to extend all about the longitudinal axis of the axle 2.

This embodiment of FIGS. 6a and 6b is particularly advantageous, as it makes it possible to avoid the braking torque transiting through the axle or through an axle hand, which limits the stresses received by the axle.

Moreover, this embodiment makes it possible to limit the number of connecting parts between the brake and the rod.

Figure 7A:
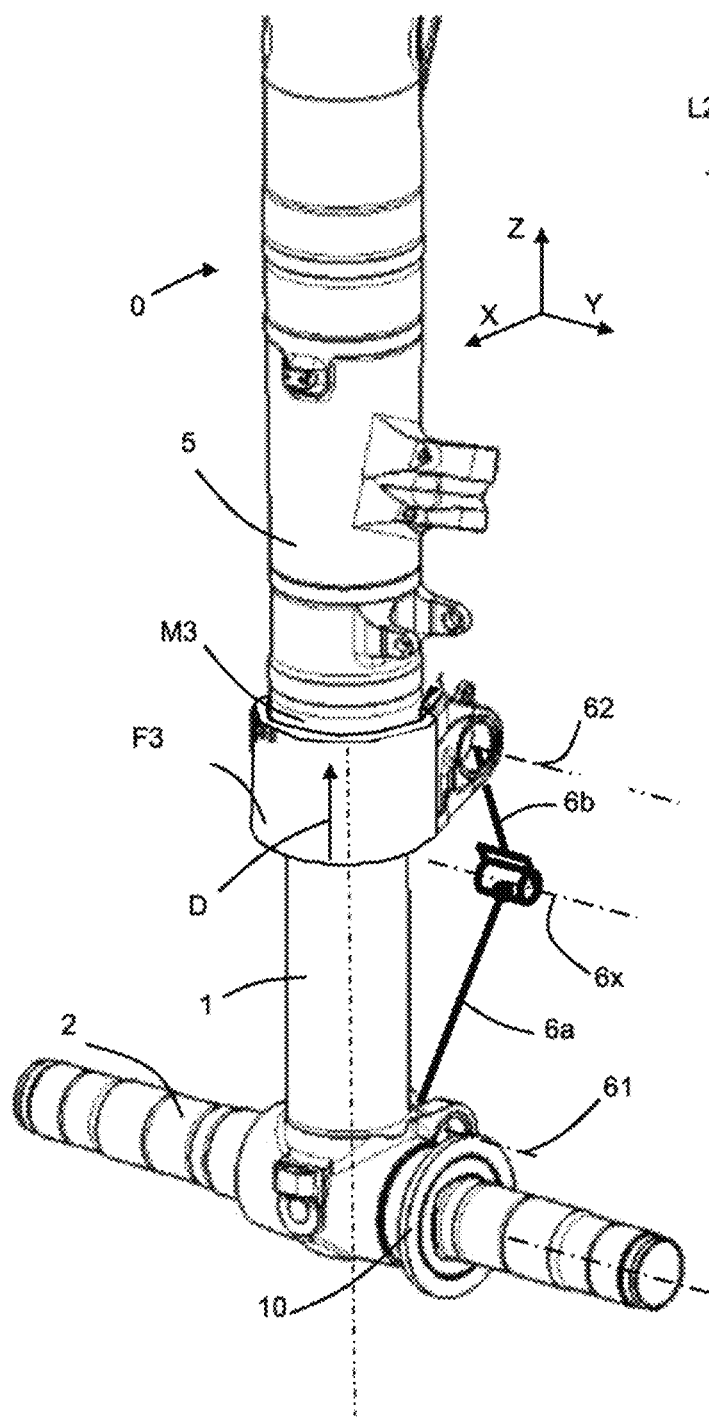
FIG. 7*a* is a perspective view of an aircraft landing gear part according to a fourth particular embodiment of the invention.
Figure 7B:
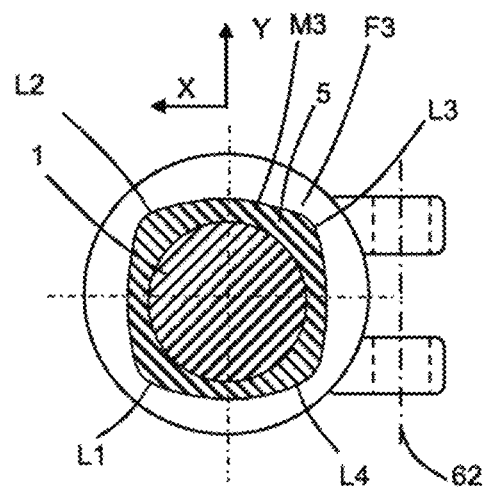
FIG. 7*b* is a partial, cross-sectional view (along a plane parallel to the plane XY) of the aircraft landing gear part represented in FIG. 7*a*.
Figure 8:
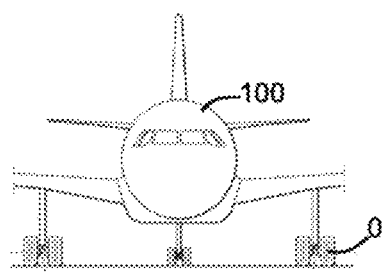
FIG. 8 is a front view of an aircraft 100 according to the invention provided with a landing gear 0 according to the invention.

According to said fifth embodiment of the landing gear according to the invention, illustrated by FIGS. 7a and 7b, the particular interlocking between male part M3 and female part F3 makes it possible to transmit torques between the sliding rod 1 and a box 5, wherein this rod 1 slides, these torques transiting via an articulated compass 6.

The box 5 constituting the male part M3 has a simplified shape, since the parts necessary for the connection with the compass 6 are not produced on the box itself, but on a sleeve which constitutes the female part F3.

The sleeve F3 is interlocked on the box 5 along the interlocking direction D, which is, in this case, parallel to the sliding direction of the rod 1 in the box 5.

To this end, the compass 6 (schematised in a thick, solid line) is provided with first and second arms 6a, 6b articulated to one another via a compass axis 6x which extends in a direction perpendicular to the interlocking direction D.

The box 5 comprises the exclusively convex external surface, when observed along the interlocking direction D, this surface being provided with rounded lobes L1, L2, L3, L4 forming an obstacle to the pivoting of the female part F3.

An end of the first arm 6a of the compass 6 is articulated via a first compass pivot 61 at the bottom of the sliding rod 1 and an end of the second arm 6b of the compass 6 is articulated via a second compass pivot 62 to the sleeve F3, such that the torque opposing the pivoting of the sliding rod 1 with respect to the box 5 transits via the sleeve F3, the lobes forming obstacles to the rotation of the female part F3 with respect to the box 5, M3.

The pivots 61 and 62 are parallel to the compass axis 6x to enable the sliding of the rod in the box, while preserving a fixed orientation of the rod 1 with respect to the box 5.

The interlocking of the male part M3 comprising the lobes L1, L2, L3, L4 in the female part F3 enables the transmission of torques between the rod 1 and the box 5 via the compass 6 and via the sleeve F3 by maintaining the orientation of the rod 1 in the box 5 all throughout the sliding of the rod.

Naturally, the invention is not limited to the embodiments described above, but comprises any variant entering into the field of the invention such as defined by the claims.

In particular, the assembly type between male part and female part with the external contact surface of the exclusively convex male part and its rounded lobes forming an obstacle to the rotation of the female part with respect to the male part on which this female part is interlocked, is applicable to the assembly of any male and female part torque of the landing gear, in any zone of the landing gear, where it is sought to transmit strong twisting and bending torques, while limiting the material volume to be engaged in the assembly.

Thus, in a particular embodiment of the landing gear according to the invention, the male part is constituted by the box of the landing gear and the female part is constituted by a ring, wherein the box is interlocked, the landing gear also comprising a main strut having an adapted upper end to be articulated via an upper articulation axis to an aircraft structure zone and a lower end articulated with respect to the female part via a main strut articulation axis.

The main strut is, in this case, deformable between a first configuration adopted when the landing gear is in retracted configuration and a second configuration adopted when the landing gear is in deployed configuration. When the landing gear is in its deployed configuration, the main strut supports significant forces to oppose the passage of the landing gear to its retracted configuration.

The invention is, in this case, particularly useful to simply connect the main strut to the box and to transmit said significant forces.

An advantage of this solution is to easily form the mechanical connection between the box and the main strut by interlocking of the female part on the box.

Thus, a box can thus be adapted to several landing gear geometries by choosing an adapted female part.

In this particular embodiment, the connection between the articulation axis of the main strut and the female part can optionally be done via a clevis carried by the female part or carried by the lower end of the strut.

In another particular embodiment of the landing gear according to the invention, the female part can comprise an external clevis to fix one or more accessories belonging to landing gears to it.

An accessory can, for example, be selected from among a harness, a pipe (a pipe is a guiding tube adapted to guide the passage of conduits or cables inside the tube and between open ends of this tube), an actuator (for example, an electric motor) or a mechanism.

As the case may be, in this particular embodiment of the landing gear according to the invention, the male part could always be the box or the sliding rod or any other male part of the landing gear.

In this particular embodiment, the invention is used to simply fix one or more accessories, while enabling a transmission of functional torques between the accessory(ies) and the male part.

It is also possible to do, such that these different examples of interlockings between male part M0 and female part F1, F2, F3 are combined and simultaneously present on one same landing gear 0.

Ideally, the internal contact surface of the female part and the external contact surface of the male part are adjusted to obtain a clamped continuous contact of the female part around the male part.

Moreover, it is naturally possible to combine all or some of the embodiments described.

Finally, the number of lobes can vary, without moving away from the scope of the invention. For example, 2 lobes, preferably 3 lobes, preferably 4 lobes or 5 or 6 lobes or more can be had, with it being understood that the greater the number of these lobes is, the greater the stresses are regularly distributed around the assembly.

The invention claimed is:

1. An aircraft landing gear, comprising:
    a male part interlocked in a female part about an interlocking direction, the male part having an external contact surface in contact against an internal contact surface of the female part, wherein the external contact surface, when observed along the interlocking direction, is an exclusively convex closed surface having external contact surface portions in the form of rounded lobes forming obstacles to the pivoting of the female part with respect to the male part about the interlocking direction; and
    a sliding rod configured to carry the male part in a bottom portion, the male part belonging to an axle configured to receive, on the one hand, a rotary wheel about an axis of rotation of the wheel, and on the other hand, a brake associated with the wheel to brake it, wherein the interlocking direction coincides with the axis of rotation of the wheel with respect to the male part and the female part forming a mechanical connection between the brake and the male part to transmit braking torque of the brake to the male part.

2. The aircraft landing gear of claim 1, wherein the internal contact surface of the female part is a closed surface and has a shape which is complementary to the external contact surface of the male part.

3. The aircraft landing gear of claim 1, wherein the external contact surface of the male part is symmetrical with respect to a median longitudinal plane of the male part.

4. The aircraft landing gear of claim 1, wherein:
    the female part is an axle hand on which the brake is secured, the axle hand being added and threaded on the male part, such that the internal contact surface of the female part is received in adjustment on the external contact surface of the male part which forms a non-circular surface to rotatably immobilize the female part on the male part; and
    a clamping means holding the female part against an axial stopping means formed on the male part to axially immobilize the female part on the male part.

5. The aircraft landing gear of claim 1, wherein the male part is interlocked in a bore passing through a lower zone of the sliding rod and forming a non-circular surface against which the male part bears to rotatably immobilize the male part with respect to the sliding rod.

6. An aircraft comprising a structure carrying at least one aircraft landing gear according to claim 1.

* * * * *